(No Model.)
A. O. PETIT.
BICYCLE BRACE.
No. 359,629. Patented Mar. 22, 1887.
Fig. 1.
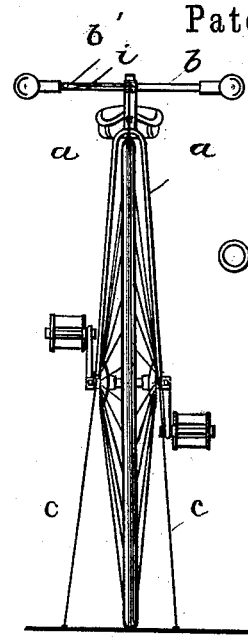
Fig. 2.
Fig. 4.
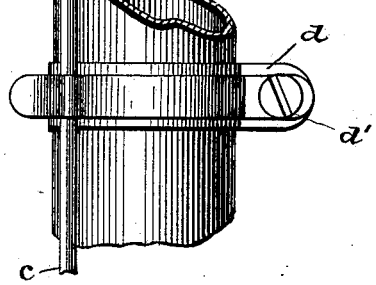
Fig. 3.
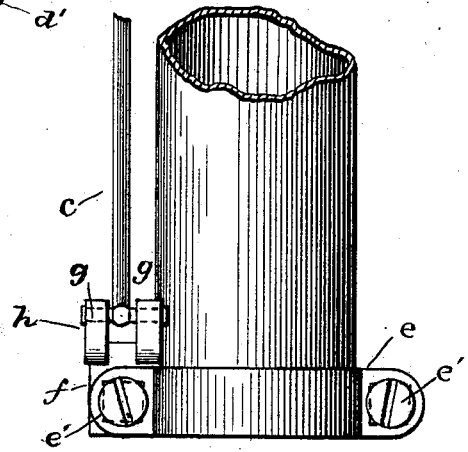
Witnesses:
Allen Webster
Geo. O. Kingsbury
Inventor
Albert O. Petit
By H. C. Bliss
Attorney.

UNITED STATES PATENT OFFICE.

ALBERT O. PETIT, OF CHICOPEE FALLS, MASSACHUSETTS.

BICYCLE-BRACE.

SPECIFICATION forming part of Letters Patent No. 359,629, dated March 22, 1887.

Application filed July 22, 1886. Serial No. 208,810. (No model.)

*To all whom it may concern:*

Be it known that I, ALBERT O. PETIT, of Chicopee Falls, Hampden county, Massachusetts, have invented a new and useful Improvement in Bicycle-Braces, of which the following is a specification.

My invention relates to a class of devices for retaining in an upright position a bicycle when at rest and in the absence of the rider; and my object is to produce a support or brace that will be simple in construction, and that will not encumber or interfere with the free use of the machine, all of which is illustrated in the accompanying drawings, in which—

Figure 1 is a front elevation of machine, showing the brace in position. Fig. 2 is a detail view showing mode of attachment of brace; Fig. 3, a detail of ball-and-socket joint on an enlarged scale; Fig. 4, a detail of clasp for holding brace to side of fork; and Fig. 5, a front view, in detail, of handle, showing device for locking the brake.

In Fig. 1 is shown a bicycle having fork $a$, handle $b$, and brake-arm $b'$, of usual construction. To lower end of fork $a$ is attached clamp or clasp $e$, encircling the fork and adjusted by means of screws $e'$. This clamp is of light metal and is easily detachable. To the pivoted holder $f$, at the end of said clasp, is adjusted the brace $c$, which articulates in the ball and socket shown in Fig. 3. This brace is of sufficient length to touch the ground some little distance laterally from the wheel. The brace terminates in a small rubber ball, to prevent its penetrating the ground when in use.

At the upper end of fork $a$ is clamp $d$, Figs. 2 and 4, provided with tongue $d'$, which normally presses against the fork and terminates in an outwardly-projecting lip, adapted to permit the brace to be slipped under it, as shown in Fig. 4. The brace, when in this position, passes up just forward of the fork, and is entirely clear from any interference with the free use of the machine.

In Fig. 3 is shown the ball-and-socket joint, by which the brace is held, by means of holder $f$, to the clasp or clamp $e$. This joint consists of the screws $g$, passing through the standards $h$, having concave ends adapted to embrace the ball at the end of the brace, as shown. The holder $f$ is pivoted to the clasp $e$ by means of screw $e'$, passing through the lower portion thereof, as shown, and is capable of swinging forward and back to relieve any strain on the ball-joint above described.

In Figs. 1 and 5 is further shown ring $i$, passing over handle $b$ and brake-arm $b'$. The ring is preferably made of rubber, but may be of any flexible material capable of holding the handle $b$ and brake-arm $b'$ together. The purpose of this device is to hold the wheel from turning and "rolling" the braces out of position for upholding the machine. This ring, when not in use, encircles the handle near the center of the bicycle, and does not interfere with the manipulation of the machine by the rider.

The brace $c$ is preferably made of tubing; but it may be a steel rod, and in either case may be quite small in diameter. A further advantage of my said device is that it may readily be adjusted to or removed from a machine by the rider, as circumstances require its use.

I have shown in my drawings a machine with two braces. One, however, will answer the purpose by inclining or bracing the machine against it.

The purpose of the pivoted or swinging holder $f$ and ball-and-socket joint is to prevent the breaking of the brace when casually wrenched, as would likely be the case were the brace pivoted directly to the fork and capable of swinging only in a fixed plane. The swinging holder by itself largely serves this purpose, and may be used with the brace pivoted on the line of screws $g$ and without the ball-joint. I therefore do not confine myself to the employment of the two jointly.

Having now fully described my invention, what I claim, and desire to secure by Letters Patent, is—

1. In a bicycle, the combination, with the fork thereof, of a brace pivoted at the lower end of such fork, a clip embracing the upper end of the fork, and a spring brace-holder secured to such clip, and consisting of an elastic strap having an offset or tongue, substantially as set forth.

2. In a bicycle, the combination, with a brace for laterally supporting the vehicle, of a brake and means for setting and holding the latter, substantially as set forth.

3. In a bicycle, the combination, with the fork thereof, of a clip embracing the lower end of the fork, a brace for laterally supporting the vehicle, and a universal joint connecting the said clip and brace, substantially as set forth.

4. In a bicycle, the combination, with the fork thereof, of two removable clips, respectively located at the upper and lower ends of such fork, of a brace pivoted to the lower clip, and a brace-holder connected with the upper clip, substantially as set forth.

5. In a bicycle, the combination, with the fork thereof, of a clip secured to the lower end of such fork, a holder pivoted to the said clip and provided with a ball-and-socket joint, and a brace mounted in such joint, substantially as set forth.

ALBERT O. PETIT.

Witnesses:
H. A. BARTLETT,
GEORGE H. DE GABRIELLE.